(12) United States Patent
Nishikawa et al.

(10) Patent No.: US 11,081,744 B2
(45) Date of Patent: Aug. 3, 2021

(54) ELECTRICITY STORAGE DEVICE AND MANAGEMENT DEVICE

(71) Applicant: Panasonic Intellectual Property Management Co., Ltd., Osaka (JP)

(72) Inventors: Shinya Nishikawa, Osaka (JP); Takashi Hasegawa, Osaka (JP); Keisuke Naito, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 336 days.

(21) Appl. No.: 16/097,681

(22) PCT Filed: May 16, 2017

(86) PCT No.: PCT/JP2017/018313
§ 371 (c)(1),
(2) Date: Oct. 30, 2018

(87) PCT Pub. No.: WO2017/208805
PCT Pub. Date: Dec. 7, 2017

(65) Prior Publication Data
US 2020/0365957 A1 Nov. 19, 2020

(30) Foreign Application Priority Data
Jun. 2, 2016 (JP) .............................. JP2016-111262

(51) Int. Cl.
*H01M 10/48* (2006.01)
*H01M 10/613* (2014.01)
(Continued)

(52) U.S. Cl.
CPC ..... *H01M 10/6563* (2015.04); *H01M 10/486* (2013.01); *H01M 10/613* (2015.04); *H01M 10/627* (2015.04); *H01M 2220/10* (2013.01)

(58) Field of Classification Search
None
See application file for complete search history.

(56) References Cited

U.S. PATENT DOCUMENTS

2015/0372356 A1* 12/2015 Kossakovski ....... H01M 10/633
136/201

FOREIGN PATENT DOCUMENTS

| JP | 9-159541 A | 6/1997 |
|----|------------|--------|
| JP | 9-224333 A | 8/1997 |

(Continued)

OTHER PUBLICATIONS

JPH09224333A—machine translation (Year: 1997).*
(Continued)

*Primary Examiner* — Haroon S. Sheikh
(74) *Attorney, Agent, or Firm* — Westerman, Hattori, Daniels & Adrian, LLP (57) ABSTRACT

A temperature detector detects a temperature of an electricity storage unit installed in a casing. A controller estimates a temperature outside the casing on the basis of a detection temperature of the electricity storage unit detected by the temperature detector. The controller estimates an outdoor air temperature outside the casing on the basis of a change amount of detection temperature per a predetermined period detected in a state where a cooling unit is operated and a change amount of detection temperature per the predetermined period detected in a state where the cooling unit is stopped.

5 Claims, 4 Drawing Sheets

(51) Int. Cl.
*H01M 10/627* (2014.01)
*H01M 10/6563* (2014.01)

(56) References Cited

FOREIGN PATENT DOCUMENTS

| | | | |
|---|---|---|---|
| JP | 2002-108483 A | | 4/2002 |
| JP | 2009-265280 A | | 11/2009 |
| JP | 2012-191770 A | | 10/2012 |
| JP | 2013-200979 A | | 10/2013 |
| JP | 2013200979 A | * | 10/2013 |
| JP | 2014-171002 A | | 9/2014 |
| JP | 2015-73392 A | | 4/2015 |

OTHER PUBLICATIONS

International Search Report dated Aug. 8, 2017, issued in counterpart International Application No. PCT/JP2017/018313 (2 pages).

* cited by examiner

| Outdoor air temperature T_o | Change ΔT_fanon of temperature during performing of fan | ChangeΔT_fanoff of temperature during stopping of fan |
|---|---|---|
| ⋮ | ⋮ | ⋮ |
| 25°C | * | * |
| 24°C | * | * |
| 23°C | * | * |
| 22°C | * | * |
| 21°C | * | * |
| ⋮ | ⋮ | ⋮ |

| Current I | Outdoor air temperature T_o | Change ΔT_fanon of temperature during performing of fan | Change ΔT_fanoff of temperature during stopping of fan |
|---|---|---|---|
| | ⋮ | ⋮ | ⋮ |
| | 25°C | * | * |
| | 24°C | * | * |
| * | 23°C | * | * |
| | 22°C | * | * |
| | 21°C | * | * |
| | ⋮ | ⋮ | ⋮ |

12fb

1

ELECTRICITY STORAGE DEVICE AND MANAGEMENT DEVICE

TECHNICAL FIELD

The present invention relates to an electricity storage device and a management device using an electricity storage cell such as a lithium ion battery.

BACKGROUND ART

Recently, an electricity storage system has been widespread, and used for a peak shift, backup, a frequency regulation (FR), and the like. The electricity storage system is constructed by, for example, an electricity storage rack in which a plurality of electricity storage modules are installed. Each of the electricity storage modules includes, for example, a plurality of lithium ion battery cells connected in series or in series and parallel. When not being used within an appropriate temperature range, a lithium ion battery invites lowering of stable operation, capacity reduction, deterioration acceleration, or the like. Recently, installation has been increased in which a number of lithium ion battery cells are densely disposed for capacity enlargement, which readily causes temperature rise of the cells. Furthermore, when an electricity storage rack is installed indoors, heat is accumulated in a room, which may increase a temperature in the room. A vent is typically provided on the electricity storage module, so that a temperature of the cells is affected by an outdoor air temperature.

In order to lower the temperature of the cells, a fan is installed outside the electricity storage rack to cool the cells in the electricity storage module from outside of a casing. In this case, the temperature of air flow generated for the electricity storage module basically becomes the same as the outdoor air temperature, so that the external temperature needs to be within an appropriate temperature range. Furthermore, in view of guarantee, a battery manufacturer needs to grasp whether the electricity storage system is used under an appropriate temperature environment by a user. Furthermore, the outdoor air temperature is also used to predict lifetime of the cells. Thus, it is conceivable that a temperature sensor for measuring the outdoor air temperature is installed outside the electricity storage rack.

CITATION LIST

Patent Literature

PTL 1: Unexamined Japanese Patent Publication No. 2013-200979

SUMMARY OF THE INVENTION

However, a temperature sensor set outside the electricity storage rack may be subjected to physical impact from the outside. Furthermore, when a protection cover is attached to the temperature sensor, cost increases. Furthermore, when a voltage of the electricity storage system is a high voltage, it is necessary to insulate between the inner electricity storage system and the outer temperature sensor, resulting in cost increase.

The present invention has been conceived in light of such circumstances, and an object thereof is to provide a technique of acquiring an external temperature of an electricity storage system without exteriorly installing a temperature sensor.

In order to solve the above-mentioned problem, an electricity storage device according to an aspect of the present invention includes an electricity storage unit installed in a casing, a temperature detector installed in the casing and configured to detect a temperature of the electricity storage unit, and a controller configured to estimate a temperature outside the casing based on a detection temperature of the electricity storage unit detected by the temperature detector. The controller estimates an outdoor air temperature outside the casing based on a change amount of the detection temperature per a predetermined period detected in a state where a cooling unit is operated and a change amount of the detection temperature per the predetermined period detected in a state where the cooling unit is stopped.

Any desired combinations of the above-described components and converted expressions of the present invention in methods, devices, systems, and other similar entities are still effective as aspects of the present invention.

According to the present invention, an external temperature of the electricity storage system can be acquired without exteriorly installing a temperature sensor.

DESCRIPTION OF EMBODIMENT

Figure 1:
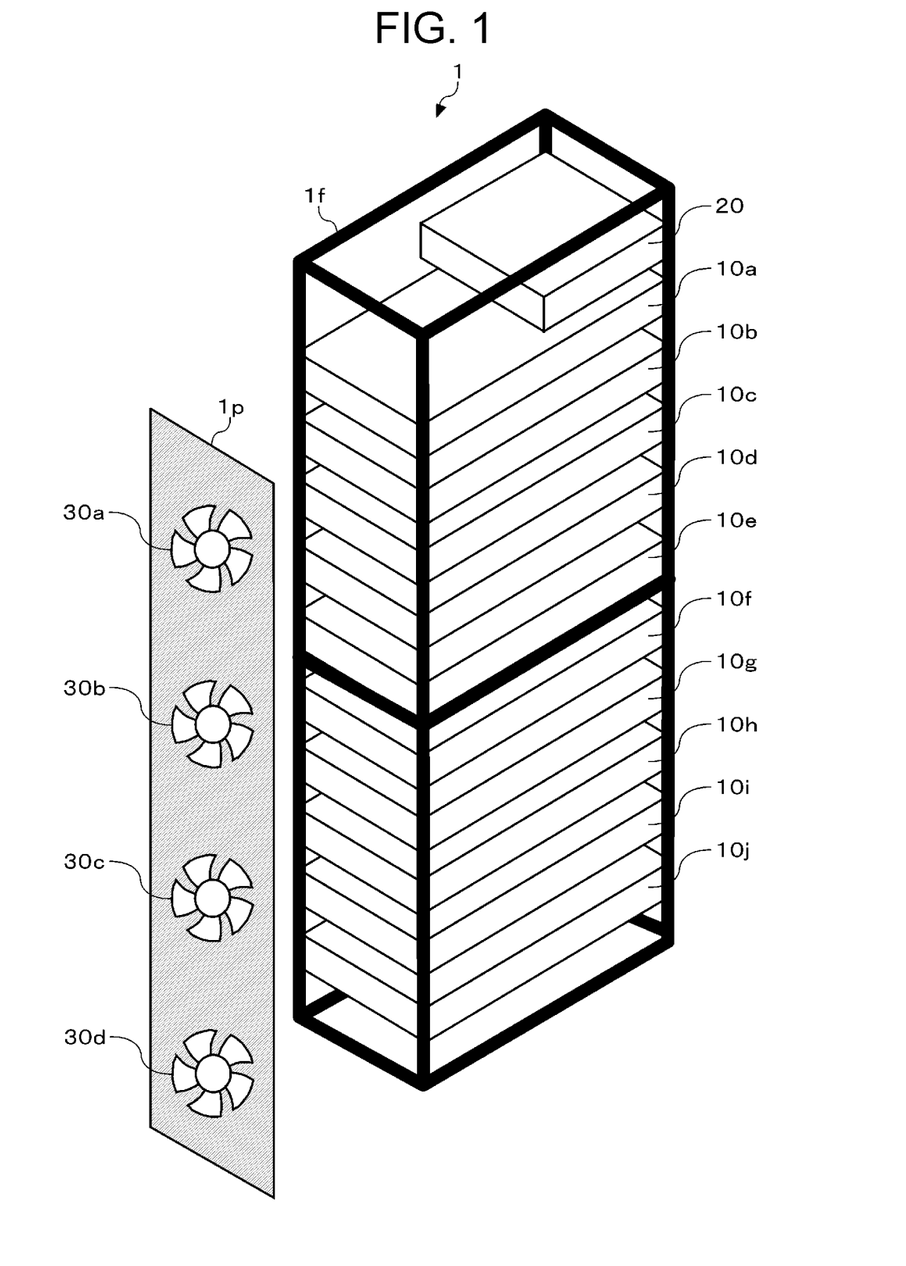
FIG. 1 is a schematic perspective view illustrating a configuration example of an electricity storage system according to an exemplary embodiment of the present invention.

FIG. 1 is a schematic perspective view illustrating a configuration example of electricity storage system 1 according to an exemplary embodiment of the present invention. Electricity storage system 1 is formed by stacking a plurality of electricity storage modules 10a to 10j and circuit device 20 and installed in a rack frame if having a rectangular parallelepiped shape. Electricity storage modules 10a to 10j and circuit device 20 are housed in respective metal housings or resin housings having a rectangular parallelepiped shape. In the example illustrated in FIG. 1, each of the plurality of electricity storage modules 10a to 10j is fixed to rack frame if with a gap by, for example, screws. Circuit device 20 is fixed to rack frame if with a gap above the plurality of electricity storage modules 10a to 10j.

Fan mounted plate 1p on which a plurality of fans 30a to 30d is fixed is attached on a side surface of an electricity storage rack constituting electricity storage system 1. The plurality of fans 30a to 30d is installed on fan mounted plate 1p at regular intervals. Note that, in FIG. 1, an example is illustrated in which a number of fans 30 is four and a number of electricity storage modules 10 is ten, but the number of fans 30 and the number of electricity storage modules 10 are options. For example, the number of fans 30 and the number of electricity storage modules 10 may be equal, or the former may be smaller or larger than the latter.

Note that, FIG. 1 illustrates a state before fan mounted plate 1p is attached to rack frame 1f. Furthermore, lines such as power lines, communication lines, and control signal lines are omitted in FIG. 1 for simplification of the drawing.

Figure 2:
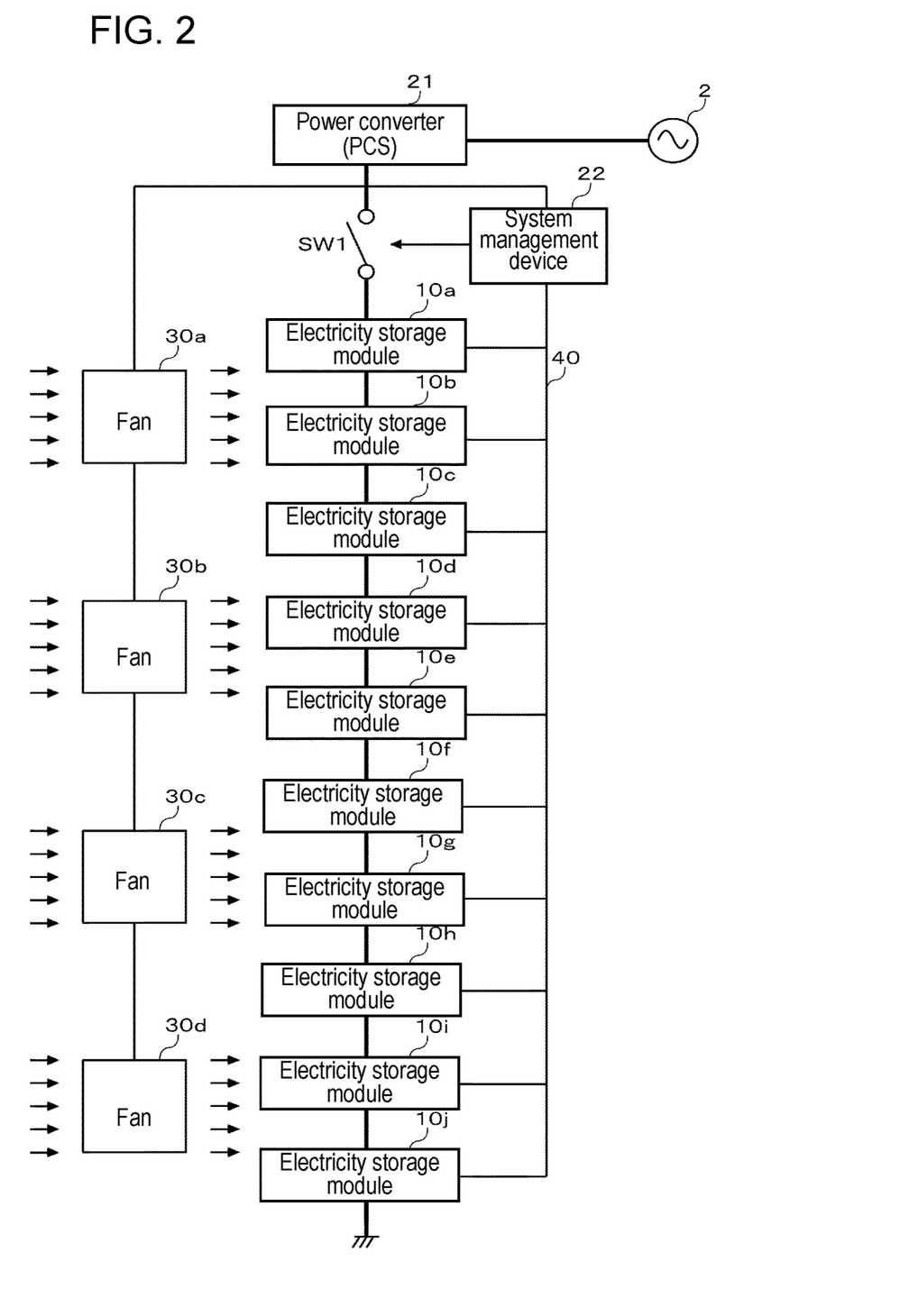
FIG. 2 is a circuit configuration of the electricity storage system of FIG. 1.

FIG. 2 is a diagram illustrating a circuit configuration of electricity storage system 1 of FIG. 1. Electricity storage system 1 includes the plurality of electricity storage modules 10a to 10j connected in series, circuit device 20, switch SW1, and the plurality of fans 30a to 30d. Circuit device 20 includes power converter 21 and system management device 22. Power converter 21 is connected between the plurality of electricity storage modules 10a to 10j and system 2.

Power converter 21 converts DC power discharged from the plurality of electricity storage modules 10a to 10j into AC power to output it to system 2, and converts the AC power input from system 2 into DC power to charge the plurality of electricity storage modules 10a to 10j. Power converter 21 can be composed of a general power conditioner system (PCS), and includes a bidirectional DC-DC converter (not shown) and a bidirectional inverter (not shown). The bidirectional DC-DC converter controls constant current (CC) charge/discharge, or constant voltage (CV) charge/discharge, and the bidirectional inverter converts DC power into AC power or converts AC power into DC power. Note that, bidirectional inverter may serve the both functions instead of using the bidirectional DC-DC converter.

Switch SW1 is inserted between power converter 21 and the plurality of electricity storage modules 10a; to 10j. For example, a relay or a semiconductor switch can be used for switch SW1. Switch SW1 is on/off controlled by system management device 22. For example, when overcurrent occurs, switch SW1 is turned off by system management device 22.

Figure 3:
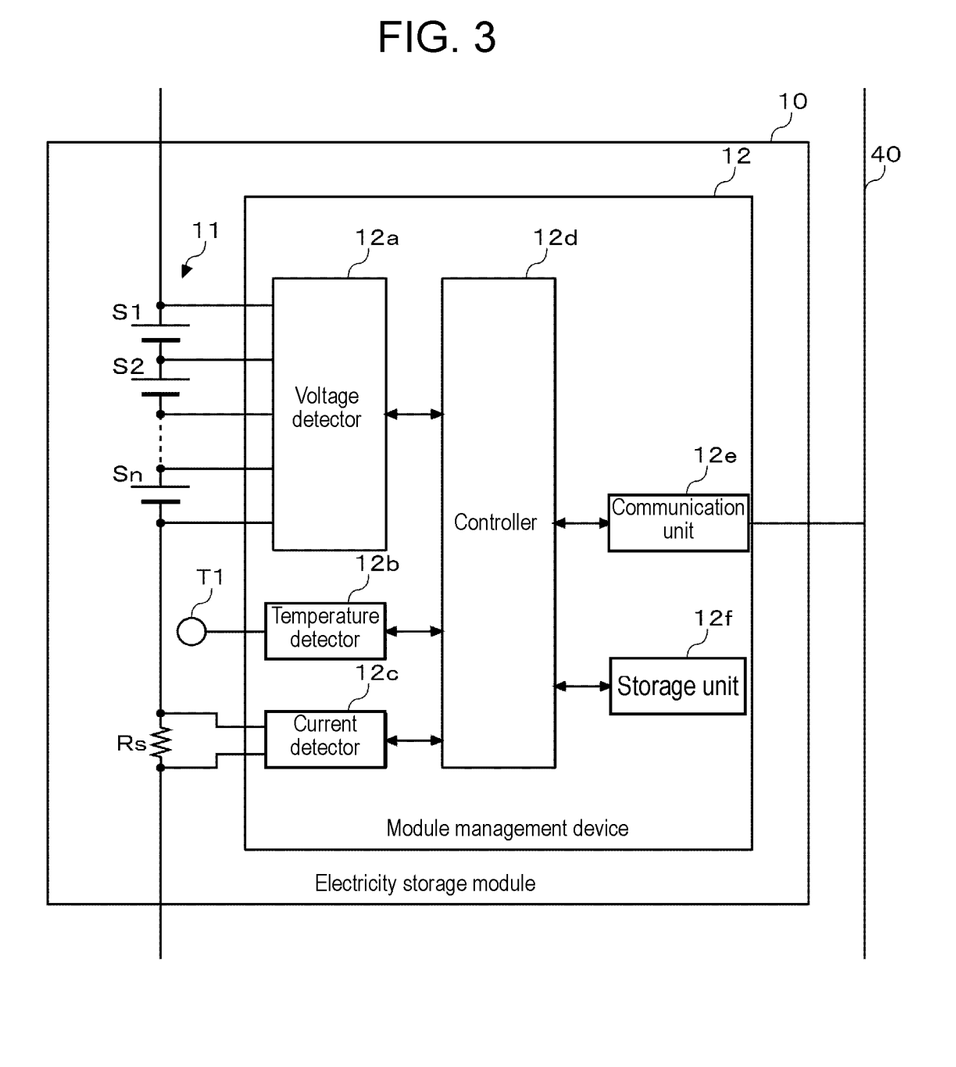
FIG. 3 is a circuit configuration example of each electricity storage module of FIG. 1 and FIG. 2.

FIG. 3 is a diagram illustrating a circuit configuration example of each of electricity storage modules 10 of FIG. 1 and FIG. 2. Electricity storage module 10 includes electricity storage unit 11, temperature sensor T1, shunt resistor Rs, and module management device 12. Electricity storage unit 11 includes a plurality of cells S1 to Sn connected in series. A lithium ion battery cell, a nickel hydride battery cell, an electric double layer capacitor cell, a lithium ion capacitor cell, or the like can be used for the cells. Hereinafter, in the description, an example is supposed that uses a lithium ion battery cell (nominal voltage: 3.6 V to 3.7 V). Note that electricity storage unit 11 is not limited to an example including the plurality of cells connected in series, and may have a configuration including a plurality of cells connected in series and parallel.

Shunt resistor Rs is connected to the plurality of cells S1 to Sn in series. Shunt resistor Rs functions as a current detection element. Note that a Hall element may be used instead of shunt resistor Rs. Temperature sensor T1 for detecting temperatures of the plurality of cells S1 to Sn is installed near the plurality of cells S1 to Sn. For example, a thermistor can be used for temperature sensor T1. Although only one temperature sensor T1 is illustrated in FIG. 3, a plurality of temperature sensors T1 (e.g., three to five temperature sensors T1) may be installed in one electricity storage module 10.

Module management device 12 includes voltage detector 12a, temperature detector 12b, current detector 12c, controller 12d, communication unit 12e, and storage unit 12f. Voltage detector 12a detects respective voltages of the plurality of cells S1 to Sn and outputs them to controller 12d. Temperature detector 12b estimates a temperature of the plurality of cells S1 to Sn on the basis of an output value of temperature sensor T1, and outputs it to controller 12d. When a plurality of temperature sensors T1 are installed, temperature detector 12b calculates an average of respective output values of the plurality of temperature sensors T1 and estimates the temperature of the plurality of cells S1 to Sn. Current detector 12c includes an error amplifier connected to both ends of shunt resistor Rs, and detects a voltage across shunt resistor Rs. Current detector 12c detects a current flowing in electricity storage unit 11 on the basis of the voltage across shunt resistor Rs, and outputs it to controller 12d.

Controller 12d manages electricity storage unit 11 on the basis of the voltage, the current, and the temperature of the plurality of cells S1 to Sn respectively detected by voltage detector 12a, current detector 12c, and temperature detector 12b. For example, controller 12d performs state-of-charge (SOC) management, equalization control, and the like of the plurality of cells S1 to Sn.

A configuration of controller 12d can be provided by cooperation of hardware and software resources, or by hardware resources alone. A microcomputer, a digital signal processor (DSP), a field programmable gate array (FPGA), or another large-scale integration (LSI) can be used as the hardware resources. A program such as firmware can be used as the software resources. Storage unit 12f can be provided by a read only memory (ROM) and a random access memory (RAM).

Controller 12d estimates the SOC of cells S1 to Sn. The SOC can be estimated by, for example, an open circuit voltage (OCV) method and/or a current integration method. A stable relation exists between the SOC and the OCV in the lithium ion battery. Thus, the SOC of each of cells S1 to Sn can be estimated by detecting the voltage across each of cells S1 to Sn in a state where no current flows in cells S1 to Sn. Increase and decrease of the SOC can be estimated by the current integration method while currents flow in cells S1 to Sn. Storage unit 12f stores various programs, data, a reference table, and the like.

Communication unit 12e performs predetermined communication control processing (e.g., communication control processing complying standards such as TCP/IP, RS-485, or the like), and communicates with other electricity storage modules 10 and/or system management device 22 via communication line 40. A metal cable may be used for communication line 40, or an optical fiber cable may be used therefor.

System management device 22 controls switch SW1 on the basis of information of the voltages, currents, temperatures, or SOCs acquired from the respective plurality of electricity storage modules 10a to 10j. System management device 22 also controls the plurality of fans 30a to 30d on the basis of temperatures acquired from the respective plurality of electricity storage modules 10a to 10j. System management device 22 drives the plurality of fans 30a to 30d when an average value of the acquired temperatures exceeds a set value (e.g., 28° C.), and stops the plurality of fans 30a to 30d when the average value is not more than the set value. When only the temperature of specific electricity storage module 10 exceeds the set value, only one fan 30 or two fans 30 adjacent to this specific electricity storage module 10 may be operated.

An internal resistance of the lithium ion battery cell increases as environmental temperature becomes low. Accordingly, it is necessary to consider the outdoor air temperature outside the casing of electricity storage module 10 for battery protection and lifetime prediction. Furthermore, design of breakdown voltage and allowable current of electricity storage modules 10 and power converter 21 is set in a constant temperature range (e.g., 18° C. to 28° C.) as a standard, and when those devices are used for a long period under a high or low temperature environment out of the temperature range, operational error may occur. Furthermore, when those devices are used under the high temperature environment, actual capacity is lowered as compared with a battery capacity in specification. A battery manufacturer needs to grasp whether electricity storage system 1 is used under an appropriate environment temperature by a user to secure operation on the premise of use under the appropriate environment temperature.

However, in terms of safeness, reliability, and economic efficiency, mounting a temperature sensor for measuring an outdoor air temperature outside a casing is not desirable. Furthermore, electricity storage module 10 for sequentially operating FR or the like also needs to estimate the outdoor air temperature.

Therefore, in the exemplary embodiment, controller 12*d* estimates outdoor air temperature T_o outside the casing of electricity storage module 10 on the basis of change amount ΔT_fanon of detection temperature per a predetermined period detected in a state where fans 30*a* to 30*d* are operated, and change amount ΔT_fanoff of detection temperature per the predetermined period detected in a state where fans 30*a* to 30*d* are stopped. The predetermined period is set to, for example, one hour, two hours, four hours, six hours, or the like.

Fans 30*a* to 30*d* are devices for changing air flow to cause air streaming, and are not devices for changing temperature itself of air. Accordingly, the temperature of air sent to electricity storage module 10 is basically equal to the temperature of air suctioned, and a cooling effect of electricity storage module 10 caused by fans 30*a* to 30*d* depends on environment temperature. Conversely, the environment temperature can be estimated by inversely operating the cooling effect of electricity storage module 10 caused by fans 30*a* to 30*d*.

Controller 12*d* estimates outdoor air temperature T_o on the basis of the following function (Formula 1).

$$T\_o = f(\Delta T\_fanon, \Delta T\_fanoff) \quad \text{(Formula 1)}$$

To achieve the above-mentioned function, for example, controller 12*d* estimates outdoor air temperature T_o by referencing a table using change mount ΔT_fanon of detection temperature and change mount ΔT_fanoff of detection temperature as input variables and using outdoor air temperature T_o as an output variable.

Figure 4:
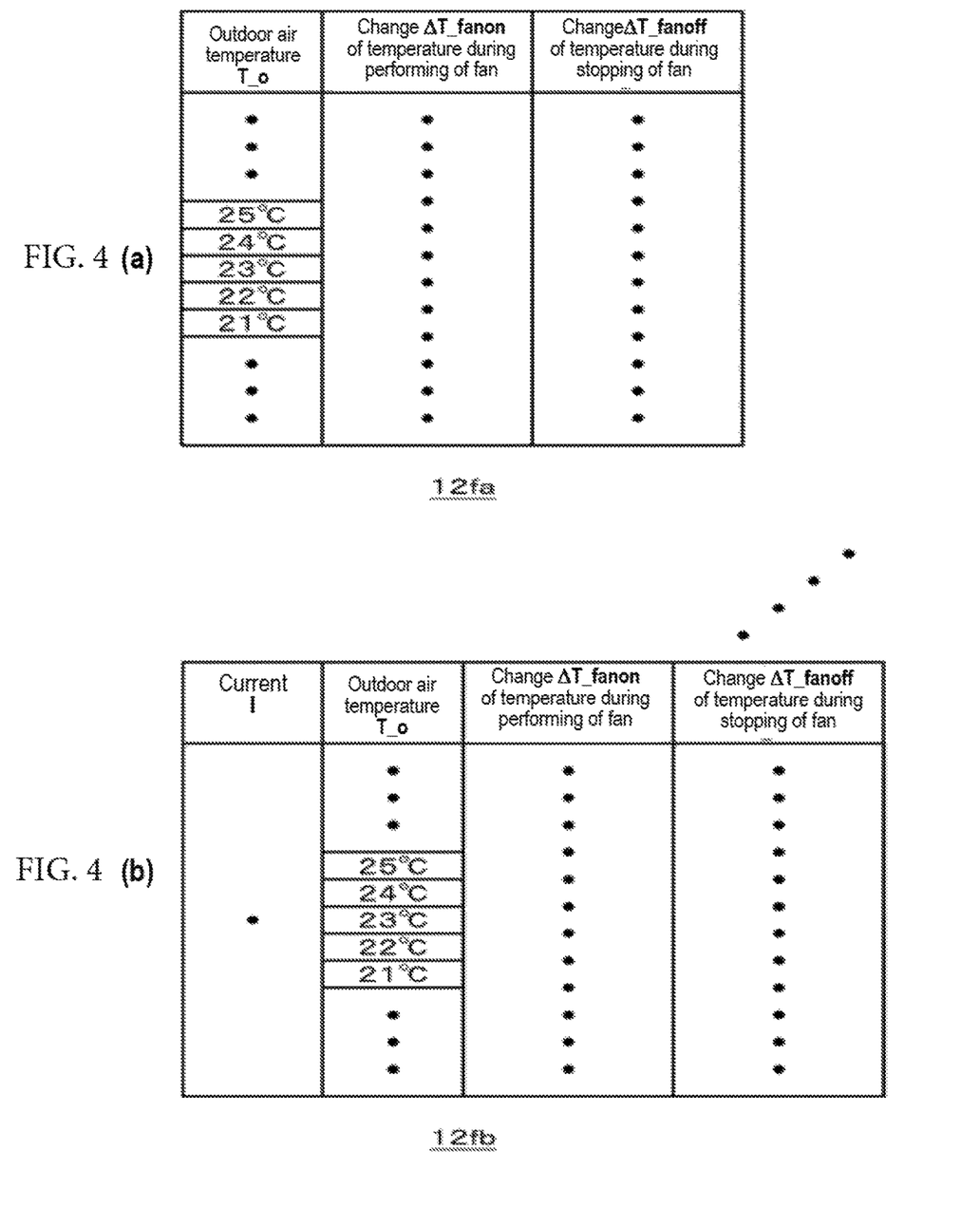
FIG. 4(a) and FIG. 4(b) each are a diagram illustrating an example of a reference table for estimating outdoor air temperature T_o.

FIG. 4(*a*) is a diagram illustrating a first example of reference table 12*fa* for estimating outdoor air temperature T_o. A designer creates this reference table 12*fa* on the basis of an experiment or a simulation. For example, the environment temperature is set to 25° C., and a change amount of temperature detected by temperature sensor T1 generated during one hour in a state where fans 30*a* to 30*d* are operated and a change amount of temperature detected by temperature sensor T1 generated during one hour in a state where fans 30*a* to 30*d* are stopped are measured and recorded. Performing the above-mentioned process under all envisaged environment temperatures completes above-mentioned reference table 12*fa*.

A charge and discharge current may be added to the input variables to enhance estimation accuracy of outdoor air temperature T_o. Controller 12*d* estimates outdoor air temperature T_o outside the casings of electricity storage modules 10 on the basis of change mount ΔT_fanon of detection temperature per the predetermined period detected in a state where fans 30*a* to 30*d* are operated, change mount ΔT_fanoff of detection temperature per the predetermined period detected in a state where fans 30*a* to 30*d* are stopped, and current I flowing in electricity storage unit 11.

Controller 12*d* estimates outdoor air temperature T_o on the basis of the following function (Formula 2).

$$T\_o = f(\Delta T\_fanon, \Delta T\_fanoff, I) \quad \text{(Formula 2)}$$

In order to achieve the above-mentioned function, for example, controller 12*d* estimates outdoor air temperature T_o by referencing a table using change mount ΔT_fanon of detection temperature, change mount ΔT_fanoff of detection temperature, and charge and discharge current I as input variables and using outdoor air temperature T_o as an output variable.

FIG. 4(*b*) is a diagram illustrating a second example of reference table 12*fb* for estimating outdoor air temperature T_o. The designer creates this reference table 12*fb* on the basis of an experiment or a simulation. The designer creates the reference table illustrated in FIG. 4(*a*) for each charge and discharge current. For example, a reference table in each current value is created in increments of 1 A. In this context, the reference table is created using a charge current as a positive value and using a discharge current as a negative value. The charge and discharge current (charge and discharge rate) shall be constant during temperature detection.

In a use in which it is not necessary to make estimation accuracy of outdoor air temperature T_o high (e.g., a confirmation use of whether the device is used under normal environment temperature), a model in which the input variables are simplified can be also used. Controller 12*d* estimates outdoor air temperature T_o outside the casing of electricity storage module 10 on the basis of change amount ΔT of detection temperature per the predetermined period and a charge and discharge rate of current I flowing in electricity storage unit 11 during the predetermined period. In this case, outdoor air temperature T_o can be estimated also in electricity storage system 1 in which no fan 30 is installed.

Controller 12*d* estimates outdoor air temperature T_o on the basis of the following function (Formula 3).

$$T\_o = f(\Delta T, I) \quad \text{(Formula 3)}$$

As described above, according to the exemplary embodiment, by estimating the temperature outside the casing on the basis of the change amount of detection temperature of temperature sensor T1 installed in the casing, the external temperature of the electricity storage system can be acquired without exteriorly installing a temperature sensor. Since the temperature sensor needs not to be installed outside, cost can be reduced. Furthermore, since the temperature sensor is prevented from being broken by physical shock from the outside, reliability improves.

The present invention is described above on the basis of the exemplary embodiment. It is to be understood to a person with ordinary skill in the art that the exemplary embodiment is an example and various modified examples of each of component elements and combinations of each treatment process may be made and the modified examples are included within the scope of the present invention.

In the above-mentioned embodiment, although a configuration is described in which electricity storage modules 10 are cooled by air cooling, a configuration can be also employed in which electricity storage modules 10 are cooled by liquid cooling. For example, when refrigerant (e.g., water) for circulation is changed depending on the environment temperature, similar to the above-mentioned exemplary embodiment, the environment temperature can be inversely estimated using a cooling effect of electricity storage module 10 caused by the liquid cooling.

Furthermore, in the above-mentioned exemplary embodiment, although an example is described in which electricity storage system 1 includes the plurality of electricity storage modules 10a to 10j connected in series, a number of electricity storage modules 10 may be one. In this case, system management device 22 is not necessary, and controller 12d directly controls fan 30.

In the above-mentioned function (Formula 2), an example is described in which charge and discharge current I is used as the input variable in addition to change amount ΔT_fanon of detection temperature per the predetermined period and change amount ΔT_fanoff of detection temperature per the predetermined period detected in a state where fans 30a to 30d are stopped. In this regard, a variable such as internal resistance R, the SOC, a state of health (SOH), or the like may be used instead of charge and discharge current I.

For example, when internal resistance R is used, controller 12d estimates outdoor air temperature T_o on the basis of the following function (Formula 4).

$$T\_o = f(\Delta T\_fanon, \Delta T\_fanoff, R) \quad \text{Formula 4)}$$

Also, not less than two among charge and discharge current I, internal resistance R, the SOC, and the SOH may be used as the input variables. Although scale of the reference table becomes large as a number of input variables increases, estimation accuracy of outdoor air temperature T_o can be improved.

Note that the exemplary embodiment can be determined by the following items.

[Item 1]

Electricity storage device (10) including:

electricity storage unit (11) installed in a casing;

temperature detector (T1, 12b) installed in the casing and configured to detect a temperature of electricity storage unit (11); and controller (12d) configured to estimate a temperature outside the casing based on the detection temperature of electricity storage unit (11) detected by temperature detector (T1, 12b), wherein controller (12d) estimates an outdoor air temperature outside the casing based on a change amount of the detection temperature per a predetermined period detected in a state where cooling unit (30) is operated and a change amount of the detection temperature per the predetermined period detected in a state where cooling unit (30) is stopped.

This makes it possible to estimate the outdoor air temperature outside the casing without installing a temperature sensor outside the casing.

[Item 2]

Electricity storage device (10) according to item 1, wherein controller (12d) estimates the outdoor air temperature by referencing table (12fa) using the change amount of the detection temperature per the predetermined period detected in a state where cooling unit (30) is operated and the change amount of the detection temperature per the predetermined period detected in a state where the cooling unit (30) is stopped as input variables and using the outdoor air temperature as an output variable.

This makes it possible to easily estimate the outdoor air temperature by referencing the table.

[Item 3]

Electricity storage device (10) according to item 1 further including current detector (12c) configured to detect a current flowing in electricity storage unit (11), wherein controller (12d) estimates the outdoor air temperature outside the casing based on the change amount of the detection temperature per the predetermined period detected in a state where cooling unit (30) is operated, the change amount of the detection temperature per the predetermined period detected in a state where the cooling unit (30) is stopped, and the current flowing in electricity storage unit (11).

This makes it possible to improve estimation accuracy of the outdoor air temperature.

[Item 4]

Electricity storage device (10) according to item 1, wherein controller (12d) estimates the outdoor air temperature outside the casing based on the change amount of the detection temperature per the predetermined period detected in a state where cooling unit (30) is operated, the change amount of the detection temperature per the predetermined period detected in a state where the cooling unit (30) is stopped, and an internal resistance of electricity storage unit (11).

This makes it possible to improve the estimation accuracy of the outdoor air temperature.

[Item 5]

Electricity storage device (10) according to any one of items 1 to 4, wherein cooling unit (30) is fan (30) installed outside the casing.

This makes it possible to inversely estimate the outdoor air temperature using a cooling effect of fan (30) suctioning outdoor air and exhausting air toward electricity storage unit (11).

[Item 6]

Electricity storage device (10) including:

electricity storage unit (11) installed in a casing;

temperature detector (T1, 12b) installed in the casing and configured to detect a temperature of electricity storage unit (11);

current detector (12c) configured to detect a current flowing in electricity storage unit (11); and controller (12d) configured to estimate a temperature outside the casing based on a detection temperature detected by temperature detector (T1, 12b) and a current detected by current detector (12c), wherein controller (12d) estimates an outdoor air temperature outside the casing based on a change amount of the detection temperature per a predetermined period and a current flowing during the predetermined period.

This makes it possible to estimate the outdoor air temperature outside the casing without installing a temperature sensor and a fan outside the casing.

[Item 7]

Management device (12) including:

temperature detector (T1, 12b) configured to detect a temperature of electricity storage unit (11) installed in a casing; and controller (12d) configured to estimate a temperature outside the casing based on a detection temperature of electricity storage unit (11) detected by temperature detector (T1, 12b), wherein controller (12d) estimates an outdoor air temperature outside the casing based on a change amount of the detection temperature per a predetermined period detected in a state where cooling unit (30) is operated and a change amount of the detection temperature per the predetermined period detected in a state where cooling unit (30) is stopped.

This makes it possible to estimate the outdoor air temperature outside the casing without installing a temperature sensor outside the casing.

The invention claimed is:

1. An electricity storage device comprising:

an electricity storage unit which is installed in a casing;

a temperature detector which is installed in the casing and detects a temperature of the electricity storage unit; and
a controller which estimates a temperature outside the casing based on a detected temperature of the electricity storage unit detected by the temperature detector,
wherein the controller estimates an outdoor air temperature outside the casing based on a change amount of the detection temperature per a predetermined period detected in a state where a cooling unit is operated and a change amount of the detection temperature per the predetermined period detected in a state where the cooling unit is stopped.

2. The electricity storage device according to claim 1, wherein the controller estimates the outdoor air temperature by referencing a table, which uses the change amount of the detection temperature per the predetermined period detected in a state where the cooling unit is operated and the change amount of the detection temperature per the predetermined period detected in a state where the cooling unit is stopped as input variables, and uses the outdoor air temperature as an output variable.

3. The electricity storage device according to claim 1, further comprising a current detector which detects a current flowing in the electricity storage unit,
wherein the controller estimates the outdoor air temperature outside the casing based on the change amount of the detection temperature per the predetermined period detected in a state where the cooling unit is operated, the change amount of the detection temperature per the predetermined period detected in a state where the cooling unit is stopped, and the current flowing in the electricity storage unit.

4. The electricity storage device according to claim 1, wherein the controller estimates the outdoor air temperature outside the casing based on the change amount of the detection temperature per the predetermined period detected in a state where a cooling unit is operated, the change amount of the detection temperature per the predetermined period detected in a state where the cooling unit is stopped, and an internal resistance of the electricity storage unit.

5. The electricity storage device according to claim 1, wherein the cooling unit is a fan installed outside the casing.

* * * * *